(12) United States Patent
Iwaki (10) Patent No.: US 12,208,816 B2
(45) Date of Patent: Jan. 28, 2025

(54) DRIVER ASSISTANCE METHOD AND DRIVER ASSISTANCE SYSTEM

(71) Applicant: TOYOTA JIDOSHA KABUSHIKI KAISHA, Toyota (JP)

(72) Inventor: Yoshiya Iwaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 168 days.

(21) Appl. No.: 18/085,836

(22) Filed: Dec. 21, 2022

(65) Prior Publication Data
US 2023/0264707 A1   Aug. 24, 2023

(30) Foreign Application Priority Data
Feb. 24, 2022 (JP) .................... 2022-026864

(51) Int. Cl.
| | |
|---|---|
| B60Q 1/00 | (2006.01) |
| B60W 40/105 | (2012.01) |
| B60W 50/14 | (2020.01) |
| G06V 20/58 | (2022.01) |

(52) U.S. Cl.
CPC .......... *B60W 50/14* (2013.01); *B60W 40/105* (2013.01); *G06V 20/582* (2022.01); *B60W 2050/146* (2013.01); *B60W 2420/403* (2013.01); *B60W 2555/60* (2020.02); *B60W 2556/40* (2020.02)

(58) Field of Classification Search
CPC ............... B60W 50/14; B60W 40/105; B60W 2050/146; B60W 2420/403; B60W 2555/60; B60W 2556/40; B60W 30/143; B60W 30/146; G06V 20/582; G08G 1/09626; G08G 1/09623
See application file for complete search history.

(56) References Cited

U.S. PATENT DOCUMENTS

| | | | |
|---|---|---|---|
| 8,064,643 B2 * | 11/2011 | Stein ................... | G06V 20/582 382/104 |
| 9,336,448 B2 * | 5/2016 | Fowe .................. | G08G 1/0112 |
| 11,341,845 B2 * | 5/2022 | Zhang ................. | G08G 1/0141 |
| 11,423,777 B2 * | 8/2022 | Hata ................... | G08G 1/09626 |
| 11,428,535 B2 * | 8/2022 | Raut ........................ | G06N 5/04 |
| 12,046,137 B1 * | 7/2024 | Dingli ................. | G06V 20/582 |
| 2016/0117922 A1 * | 4/2016 | Oh ...................... | G01C 21/3691 348/118 |
| 2017/0092125 A1 * | 3/2017 | Fujimaki ............ | G08G 1/09626 |

(Continued)

FOREIGN PATENT DOCUMENTS

| | | |
|---|---|---|
| JP | 2012-164254 A | 8/2012 |
| JP | 2017-215902 A | 12/2017 |

(Continued)

*Primary Examiner* — Toan N Pham
(74) *Attorney, Agent, or Firm* — Dinsmore & Shohl LLP (57) ABSTRACT

A driver assistance method that is applied to a vehicle includes: reading a speed limit at a position at which the vehicle is traveling, from map information in which the speed limit is registered; displaying the speed limit read from the map information on a display device; and disabling updating of the speed limit to be displayed on the display device based on the map information in a first section in which a temporary speed limit is set, even when the speed limit registered in the map information changes.

9 Claims, 9 Drawing Sheets

(56) References Cited

U.S. PATENT DOCUMENTS

2017/0349097 A1 12/2017 Nishimura
2021/0304598 A1 9/2021 Hata et al.
2021/0380123 A1 12/2021 Lim

FOREIGN PATENT DOCUMENTS

JP 2021-157712 A 10/2021
WO 2020/144204 A1 7/2020

* cited by examiner

DRIVER ASSISTANCE METHOD AND DRIVER ASSISTANCE SYSTEM

CROSS-REFERENCE TO RELATED APPLICATION

This application claims priority to Japanese Patent Application No. 2022-026864 filed on Feb. 24, 2022, incorporated herein by reference in its entirety.

BACKGROUND

1. Technical Field

The present disclosure relates to a driver assistance method and a driver assistance system that are applied to vehicles. In particular, the present disclosure relates to technology for displaying a speed limit on a display device.

2. Description of Related Art

Japanese Unexamined Patent Application Publication No. 2012-164254 (JP 2012-164254 A) discloses a traffic sign recognition device installed in a vehicle. The traffic sign recognition device recognizes road signs based on image data obtained by an in-vehicle camera. The traffic sign recognition device determines whether a recognized road sign is a fixed traffic sign or a temporary traffic sign, based on the position of the road sign that is recognized, and map information.

Japanese Unexamined Patent Application Publication No. 2017-215902 (JP 2017-215902 A) discloses a speed limit display device installed in a vehicle. The speed limit display device includes display means capable of displaying the speed limit of the road on which the vehicle is traveling.

SUMMARY

Information of the speed limit at the position at which the vehicle is traveling is useful for vehicle drivers and remote operators. That is to say, displaying the speed limit on a display device for the drivers and the remote operators is desirable from the perspective of driver assistance. Now, using map information in which speed limits are registered is conceivable. That is to say, reading the speed limit for the position at which the vehicle is traveling from the map information, and displaying the speed limit that is read on the display device, are conceivable. This enables displaying information of speed limits even in sections where speed limit traffic signs are not installed.

On the other hand, there are situations in which a temporary speed limit is set instead of a speed limit that is set in advance. For example, a temporary speed limit may be set in a road construction section, instead of the speed limit that is set in advance. As another example, a temporary speed limit may be set depending on weather conditions or time of the day. Such temporary speed limits are not registered in the map information. Accordingly, when the speed limit displayed on the display device is updated based on the speed limit set in advance that is read from the map information, an incorrect speed limit that is deviated from the actual state (temporary speed limit) will be displayed.

The present disclosure provides a driver assistance method and a driver assistance system that can suppress incorrect speed limits deviated from the actual state from being displayed on a display device.

A driver assistance method that is applied to a vehicle, according to a first aspect of the present disclosure, includes reading a speed limit at a position at which the vehicle is traveling, from map information in which the speed limit is registered, displaying the speed limit read from the map information on a display device, and disabling updating of the speed limit to be displayed on the display device based on the map information in a first section in which a temporary speed limit is set, even when the speed limit registered in the map information changes.

The driver assistance method according to the first aspect of the present disclosure may further include recognizing the first section, based on an image of around the vehicle, obtained by a camera installed in the vehicle.

In the driver assistance method according to the first aspect of the present disclosure, recognizing the first section may include recognizing a start of the first section by recognizing a first traffic sign indicating the start of the first section, based on the image.

In the driver assistance method according to the first aspect of the present disclosure, the first traffic sign may be any one of a road construction sign indicating the start of a road construction section, a variable electronic traffic sign for changeably displaying the speed limit, and a speed limit traffic sign accompanied by a supplementary traffic sign indicating conditions under which the speed limit is applied.

The driver assistance method according to the first aspect of the present disclosure may further include displaying the temporary speed limit on the display device in the first section when the first traffic sign indicates the temporary speed limit.

In the driver assistance method according to the first aspect of the present disclosure, recognizing the first section may include recognizing an end of the first section by recognizing a second traffic sign indicating the end of the first section, based on the image.

The driver assistance method according to the first aspect of the present disclosure may further include determining that the first section is ended when an ending condition is satisfied. The ending condition may include at least one of: the vehicle making a right turn or a left turn; the vehicle traveling a certain distance from the start of the first section; and recognizing a traffic sign that indicates the end of the first section.

The driver assistance method according to the first aspect of the present disclosure may further include warning a driver of the vehicle when the speed of the vehicle exceeds the speed limit displayed on the display device.

A driver assistance system that is applied to a vehicle according to a second aspect of the present disclosure includes one or a plurality of storage devices configured to store map information in which a speed limit is registered, and one or a plurality of processors. The one or plurality of processors is configured to read the speed limit at a position at which the vehicle is traveling, from the map information, displaying the speed limit read from the map information on a display device, and disable updating of the speed limit to be displayed on the display device based on the map information in a first section in which a temporary speed limit is set, even when the speed limit registered in the map information changes.

With the present disclosure, in the first section in which the temporary speed limit is set, the speed limit displayed on the display device is not updated, even when the speed limit registered in the map information changes. Thus, an incorrect speed limit that is deviated from the actual state is suppressed from being displayed.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

An embodiment of the present disclosure will be described with reference to the accompanying drawings.

1. Overview

Figure 1:
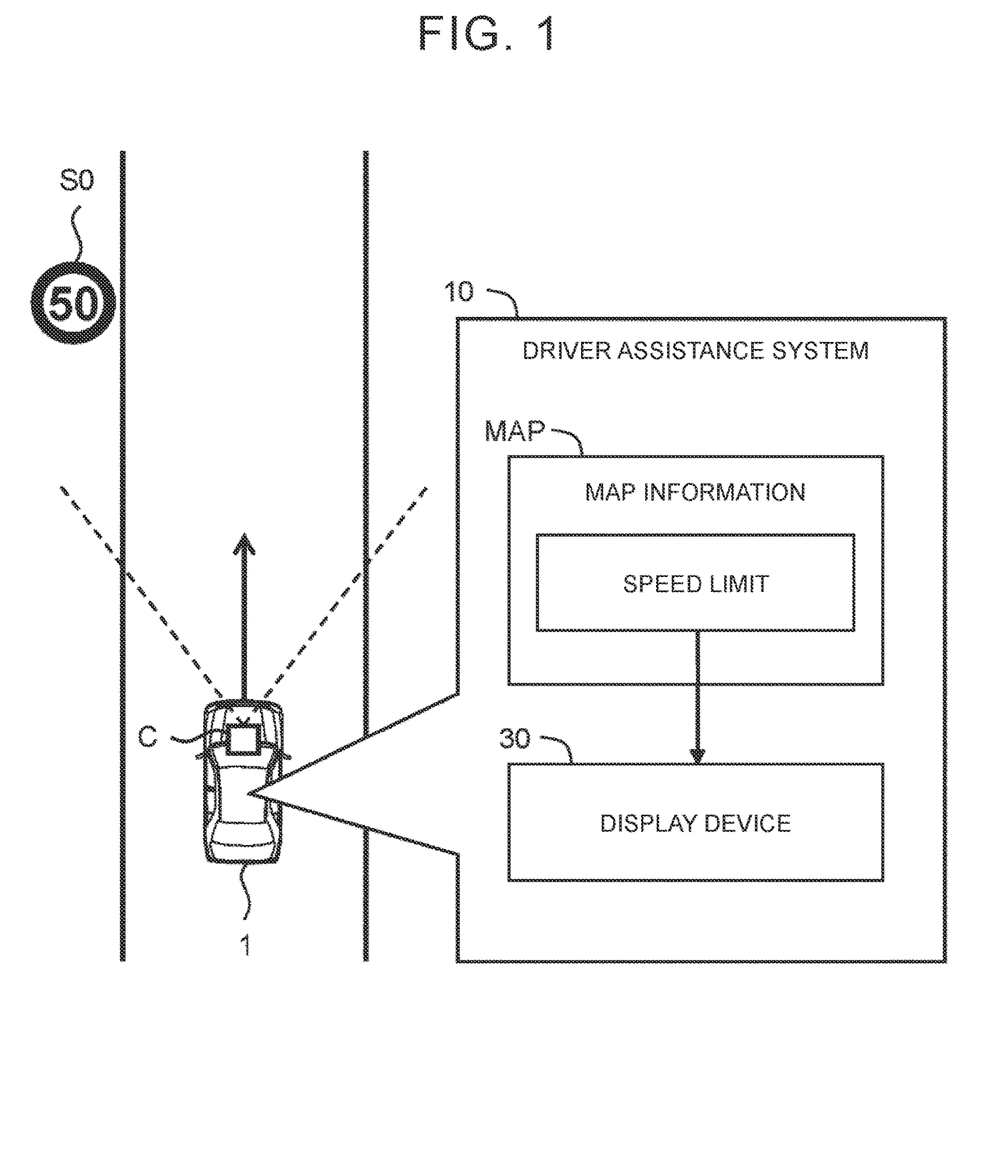
FIG. 1 is a conceptual diagram for describing an overview of a driver assistance system applied to a vehicle according to an embodiment of the present disclosure.

FIG. 1 is a conceptual diagram for describing an overview of a driver assistance system 10 applied to a vehicle 1 according to the present embodiment. The driver assistance system 10 performs driver assistance regarding driving of the vehicle 1. For example, the driver assistance system 10 is installed in the vehicle 1. Alternatively, at least part of the driver assistance system 10 may be included in a remote system external from the vehicle 1, to remotely perform driver assistance regarding driving the vehicle 1. That is to say, the driver assistance system 10 may be dispersedly disposed in the vehicle 1 and the remote system. The vehicle 1 may be subject to remote operation by a remote operator. In this case, the vehicle 1 and a remote operator terminal on the remote operator side communicate with each other, and exchange information necessary for remote operation. The driver assistance system 10 may be applied to the vehicle 1 that performs partially autonomous driving.

In the following description, a case in which a driver onboard the vehicle 1 drives the vehicle 1 will be considered. When remote operation is performed by a remote operator, the term "driver" shall be read as "remote operator", and the term "display device installed in the vehicle 1" shall be read as "display device of remote operator terminal on remote operator side".

The driver assistance system 10 includes a display device 30 installed in the vehicle 1. The driver assistance system 10 performs driver assistance for the driver driving the vehicle 1, by displaying various types of information on the display device 30. For example, the driver assistance system 10 displays the speed limit at the position where the vehicle 1 is traveling, on the display device 30. Such speed limit information is useful for the driver of the vehicle 1. The processing of displaying the speed limit on the display device 30 of the vehicle 1 will be hereinafter referred to as "speed limit display processing".

The speed limit information is obtained, for example, from a speed limit traffic sign S0 installed on the wayside of the road. A camera C for taking images of the situation around the vehicle 1 is installed in the vehicle 1. The driver assistance system 10 acquires images around the vehicle 1 using the camera C. The driver assistance system 10 recognizes the speed limit traffic sign S0 based on the acquired images. Further, the driver assistance system 10 recognizes (reads) the speed limit written on the speed limit traffic sign S0, based on the acquired images. The driver assistance system 10 then displays the speed limit, acquired from the speed limit traffic sign S0, on the display device 30.

However, the speed limit traffic signs S0 are not necessarily installed on the wayside of the road with high frequency. Also, in some situations, the camera C may not be able to correctly recognize the speed limit traffic sign S0.

Therefore, according to the present embodiment, "map information MAP" is also used in the speed limit display processing. Speed limits set in advance for the road are registered in the map information MAP. The speed limit registered in the map information MAP will be hereinafter referred to as "predetermined speed limit LM". That is to say, the map information MAP indicates the position and the predetermined speed limit LM in correlation. In other words, the map information MAP gives the predetermined speed limit LM as a function of the position. Here, "position" is a concept including a section, a region, and so forth. In the map information MAP, the position and the road type may be correlated. Note that the map information MAP may be stored in a storage device of the vehicle 1, or may be stored in a storage device of a map management system, externally from the vehicle 1.

Figure 2:
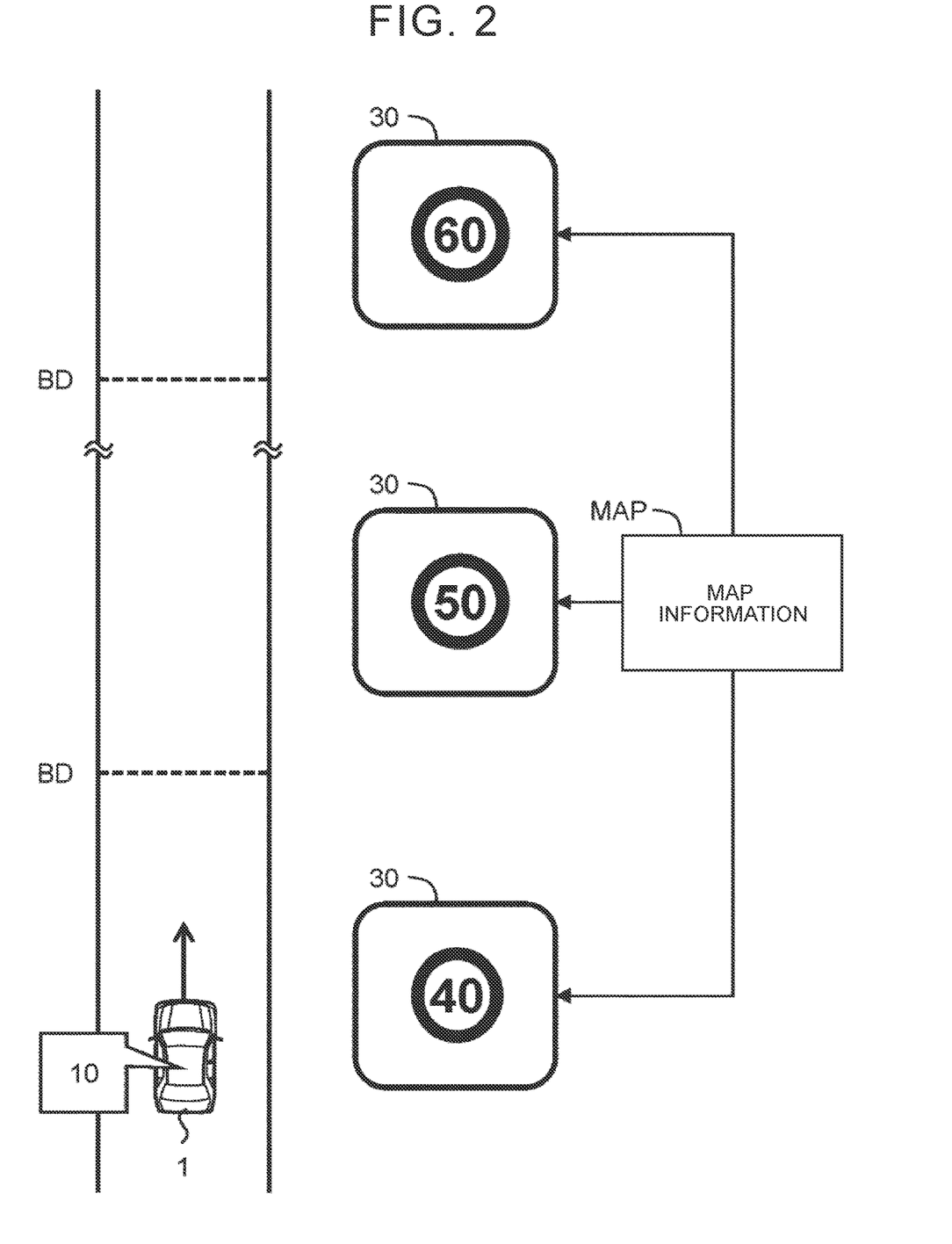
FIG. 2 is a conceptual diagram for describing speed limit display processing based on map information according to the embodiment of the present disclosure.

FIG. 2 is a conceptual diagram for describing speed limit display processing based on the map information MAP. The driver assistance system 10 reads the predetermined speed limit LM at the position at which the vehicle 1 is traveling, from the map information MAP. The driver assistance system 10 displays a predetermined speed limit LM read from the map information MAP on the display device 30. A speed limit boundary BD is a position at which the predetermined speed limit LM changes. In many cases, when the road type changes, the predetermined speed limit LM also changes. However, changing of the predetermined speed limit LM is not limited to this. The driver assistance system 10 updates the predetermined speed limit LM to be displayed on the display device 30 in conjunction with the vehicle 1 passing the speed limit boundaries BD. For example, the driver assistance system 10 updates the predetermined speed limit LM displayed on the display device 30 immediately prior to or following the vehicle 1 passing the speed limit boundaries BD.

Using the map information MAP in this way enables displaying the predetermined speed limit LM even in sections in which no speed limit traffic signs S0 are installed. Also, the predetermined speed limit LM can be displayed even when the camera C is unable to recognize the speed limit traffic sign S0.

However, there are also situations in which a temporary speed limit is set instead of the predetermined speed limit LM. A temporary speed limit that is not a predetermined speed limit LM will be hereinafter referred to as a "temporary speed limit LMtemp". A section in which the temporary speed limit LMtemp is set will be hereinafter referred to as a "temporary speed limit section X1" (first section).

Figure 3:
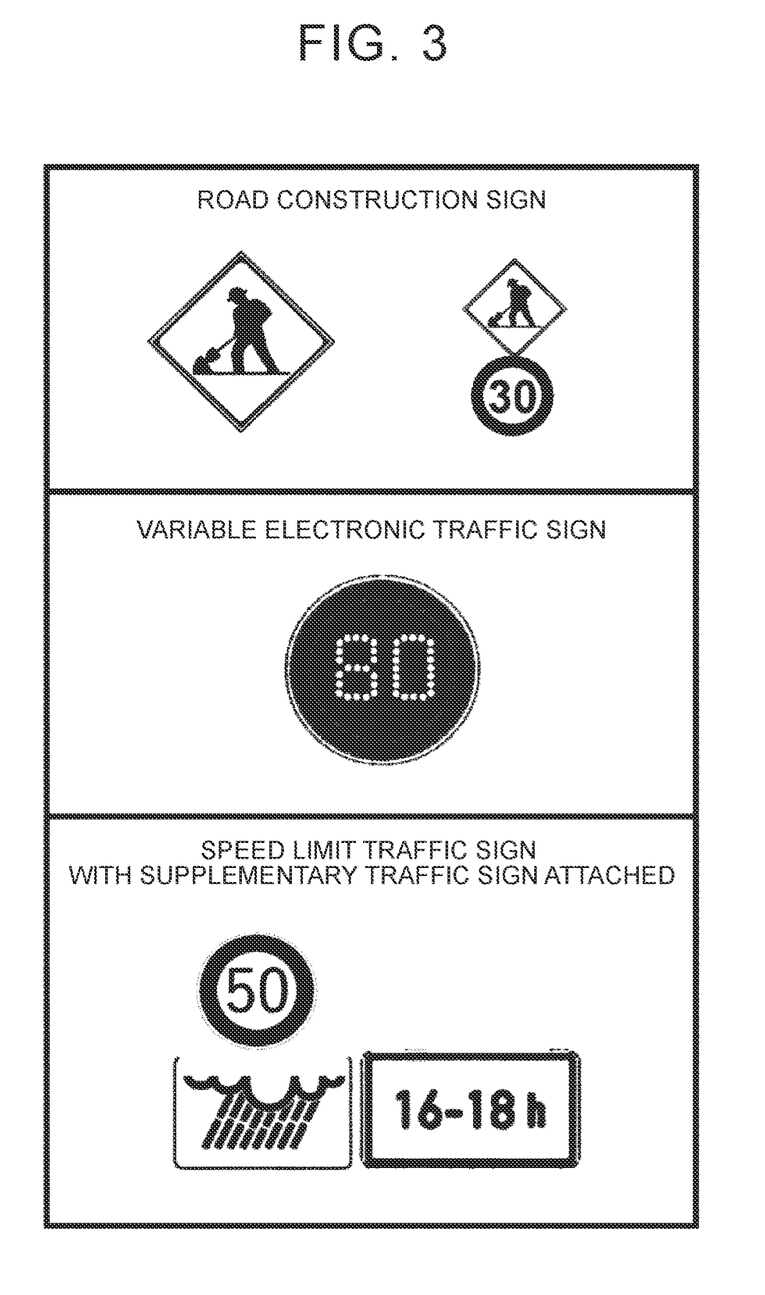
FIG. 3 is a conceptual diagram for describing examples of temporary speed limit sections.

FIG. 3 is a conceptual diagram for describing examples of temporary speed limit sections X1. For example, the speed limit in road construction sections is generally set lower than the predetermined speed limit LM. The start of a road construction section is often indicated by a road construction sign. In some cases, a speed limit traffic sign indicating the temporary speed limit LMtemp that is applied to this road construction section is attached to the road construction sign.

As another example, there are cases in which the temporary speed limit LMtemp is variably set depending on weather conditions or time of the day. Such a temporary speed limit LMtemp is indicated, for example, by a variable electronic traffic sign of which the display can be changed. As another example, there also are cases in which a supplementary traffic sign indicating conditions of application of the temporary speed limit LMtemp is attached to the speed limit traffic sign.

The temporary speed limit LMtemp is not registered in the map information MAP. Accordingly, when the speed limit displayed on the display device 30 is updated based on the predetermined speed limit LM read from the map information MAP, an incorrect speed limit that is deviated from the actual state (temporary speed limit LMtemp) will be displayed.

Figure 4:
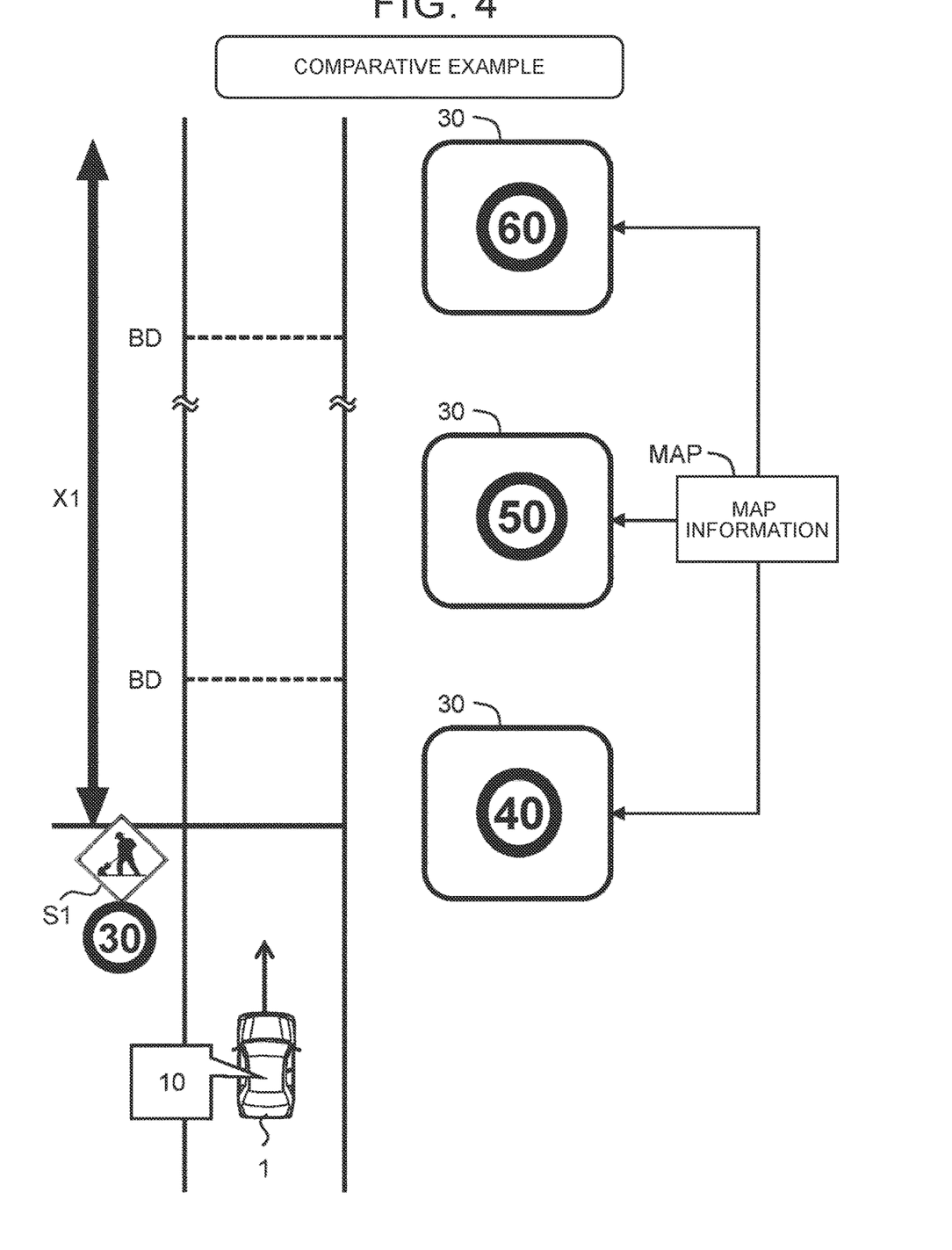
FIG. 4 is a conceptual diagram for describing a comparative example.

FIG. 4 is a conceptual diagram for describing a comparative example. There is a temporary speed limit section X1 ahead of the vehicle 1. In the temporary speed limit section X1, there are speed limit boundaries BD at which the predetermined speed limit LM changes. In the case of the comparative example, when the vehicle 1 passes the speed limit boundaries BD, the speed limit displayed on the display device 30 is updated based on the map information MAP. However, the predetermined speed limit LM read from the map information MAP is different from the temporary speed limit LMtemp set for the temporary speed limit section X1. That is to say, an incorrect speed limit, which is deviated from the actual state (temporary speed limit LMtemp), will be displayed on the display device 30. It is undesirable from the perspective of driver assistance that a speed limit deviated from the actual state (temporary speed limit LMtemp) would be displayed on the display device 30.

Accordingly, the driver assistance system 10 according to the present embodiment is configured to suppress incorrect speed limits that are deviated from the actual state from being displayed on the display device 30. More specifically, in the temporary speed limit section X1, even when the predetermined speed limit LM registered in the map information MAP changes, the driver assistance system 10 disables updating of the speed limit displayed on the display device 30 (based on the map information MAP). This processing will be hereinafter referred to as "display update disabling processing".

Figure 5:
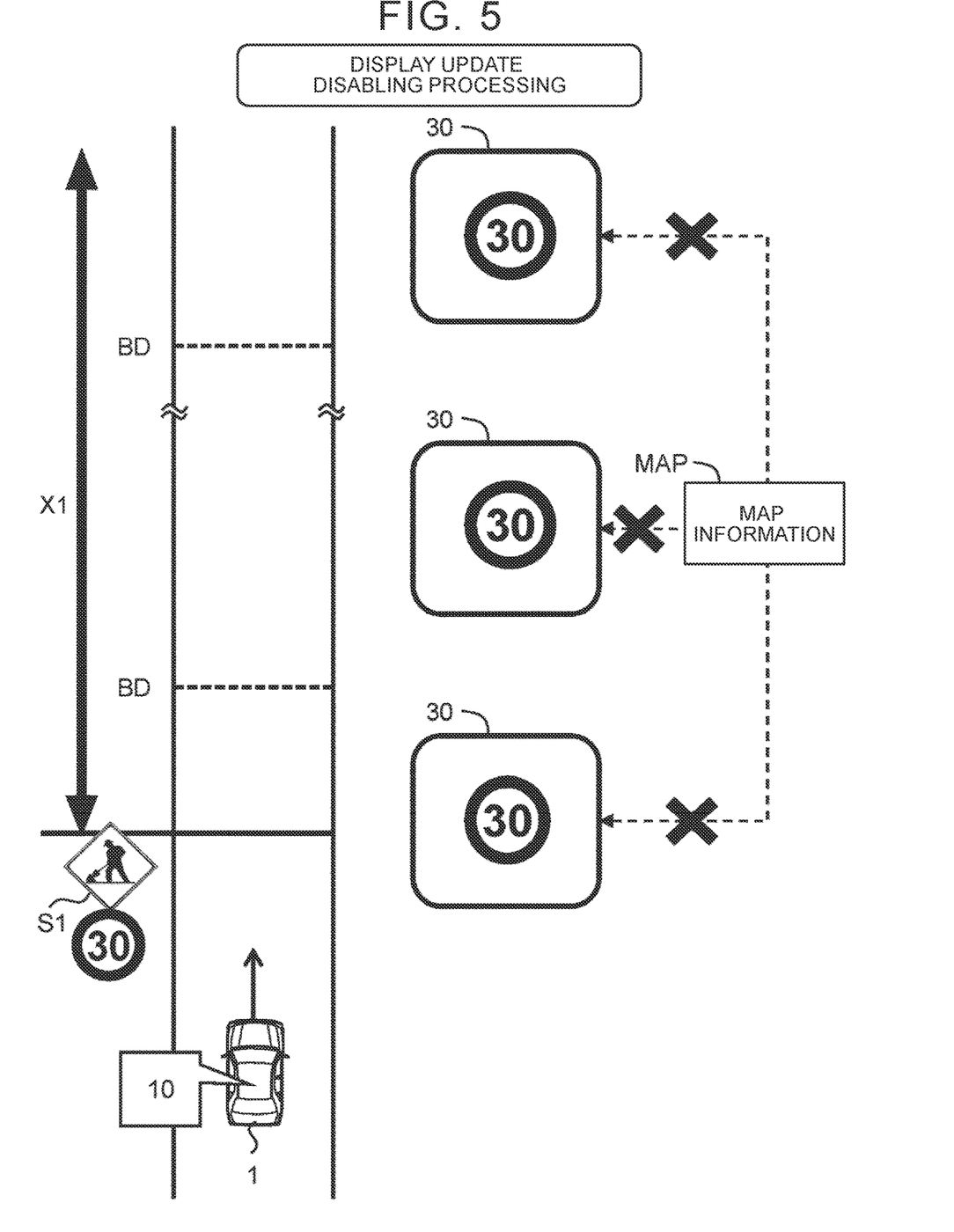
FIG. 5 is a conceptual diagram for describing an example of display update disabling processing according to the embodiment of the present disclosure.

FIG. 5 is a conceptual diagram for describing an example of the display update disabling processing. There is a temporary speed limit section X1 ahead of the vehicle 1. There is a first traffic sign S1, indicating the start of the temporary speed limit section X1, in the vicinity of the start point of the temporary speed limit section X1. The traffic signs illustrated in FIG. 3 are exemplified as the first traffic sign S1. The driver assistance system recognizes the start of the temporary speed limit section X1 by recognizing the first traffic sign S1 using the camera C. When the first traffic sign S1 indicates a temporary speed limit LMtemp, the driver assistance system 10 may display the temporary speed limit LMtemp read from the first traffic sign S1 on the display device 30. The vehicle 1 passes the speed limit boundaries BD while traveling in the temporary speed limit section X1. That is to say, the predetermined speed limit LM changes while the vehicle 1 travels in the temporary speed limit section X1. Even in such a case, the driver assistance system 10 disables updating of the speed limit displayed on the display device 30 based on the map information MAP.

As described above, according to the present embodiment, even when the predetermined speed limit LM registered in the map information MAP changes in the temporary speed limit section X1 in which the temporary speed limit LMtemp is set, the speed limit displayed on the display device 30 is not updated. Accordingly, an incorrect speed limit, which is deviated from the actual state (temporary speed limit LMtemp), can be suppressed from being displayed on the display device 30.

The driver assistance system 10 according to the present embodiment will be described in further detail below.

2. Example of Driver Assistance System 2-1. Configuration Example

Figure 6:
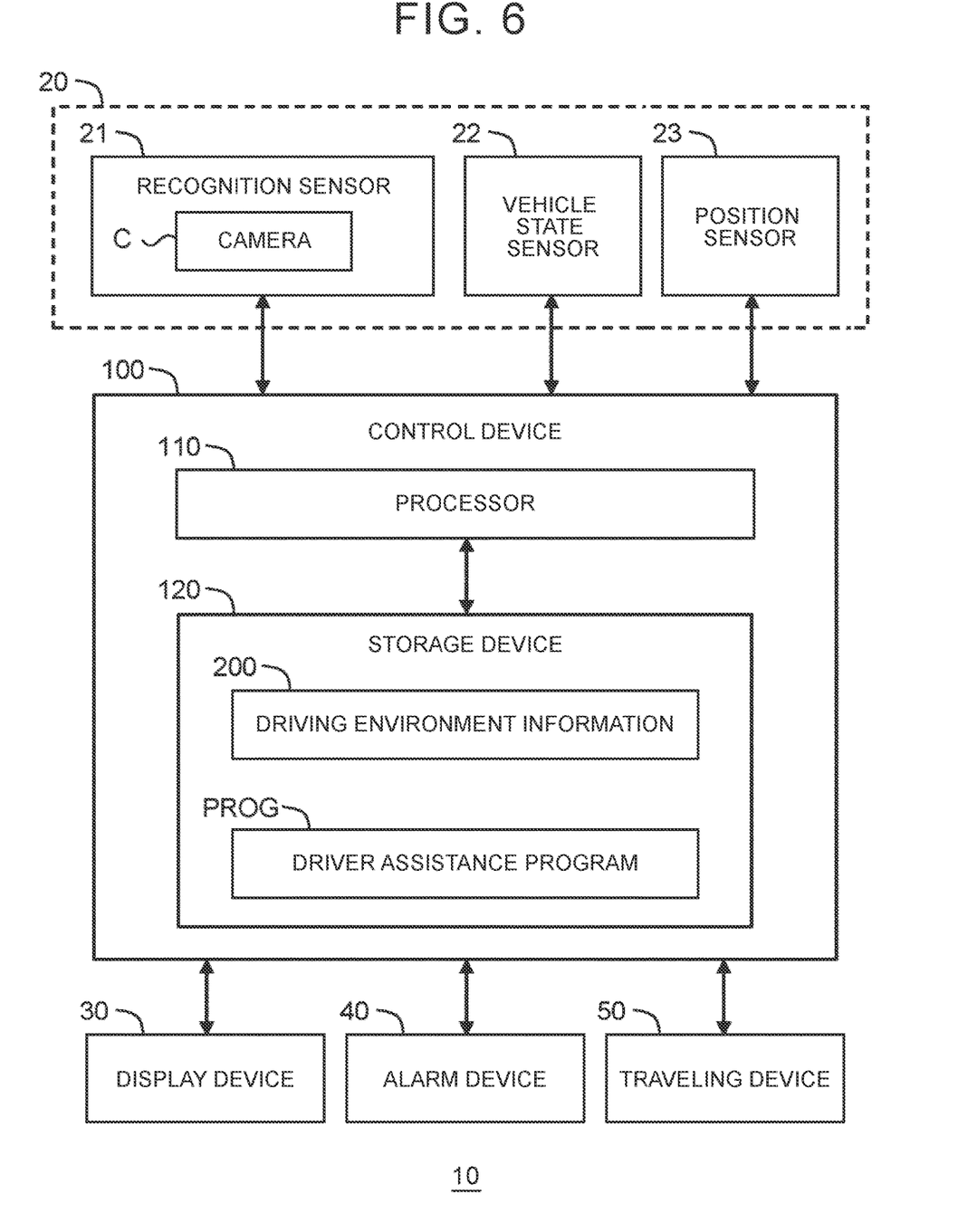
FIG. 6 is a block diagram illustrating a configuration example of a driver assistance system according to the embodiment of the present disclosure.

FIG. 6 is a block diagram illustrating a configuration example of the driver assistance system 10 according to the present embodiment. The driver assistance system 10 includes a sensor group 20, the display device 30, an alarm device 40, a traveling device 50, and a control device 100.

The sensor group 20 is installed in the vehicle 1. The sensor group 20 includes a recognition sensor 21, a vehicle state sensor 22, a position sensor 23, and so forth.

The recognition sensor 21 recognizes (detects) the situation around the vehicle 1. The recognition sensor 21 includes the camera C. The recognition sensor 21 may include a Light Imaging Detection and Ranging sensor (LIDAR sensor), a radar device, and so forth.

The vehicle state sensor 22 detects the state of the vehicle 1. The vehicle state sensor 22 includes, for example, a speed sensor, an acceleration sensor, a yaw rate sensor, a steering angle sensor, and so forth.

The position sensor 23 detects the position and orientation of the vehicle 1. Examples of the position sensor 23 include a Global Positioning System (GPS) sensor.

The display device 30 (display) is installed in the vehicle 1, and displays various types of information. The display device 30 is installed at a position visible to the driver of the vehicle 1. For example, the display device 30 is included in a meter panel. As another example, the display device 30 may be a head-up display (HUD).

The alarm device 40 is installed in the vehicle 1, and outputs visual or audible alarms. For example, the alarm device 40 includes a display device. As another example, the alarm device 40 includes a speaker. The alarm device 40 and the display device may be the same device.

The traveling device 50 includes a steering device, a drive device, and a braking device. The steering device performs steering of wheels. Examples of the steering device include an electric power steering (EPS) device. The drive device is a power source that generates a drive force. Examples of the drive device include an engine, an electric motor, in-wheel motors, and so forth. The braking device generates a braking force.

The control device 100 controls the vehicle 1. The control device 100 includes one or a plurality of processors 110

(hereinafter simply referred to as "processor 110") and one or a plurality of storage devices 120 (hereinafter simply referred to as "storage device 120"). The processor 110 executes various types of processing. For example, the processor 110 includes a central processing unit (CPU). The storage device 120 stores various types of information. Examples of the storage device 120 include volatile memory, non-volatile memory, a hard disk drive (HDD), a solid state drive (SSD), and so forth. The control device 100 may include one or a plurality of electronic control units (ECUs). Part of the control device 100 may be an information processing device that is external from the vehicle 1. In this case, the part of the control device 100 communicates with the vehicle 1 to remotely control the vehicle 1.

A driver assistance program PROG is a computer program for controlling the vehicle 1. Various types of processing are realized by the control device 100, by the processor 110 executing the driver assistance program PROG. The driver assistance program PROG is stored in the storage device 120. Alternatively, the driver assistance program PROG may be recorded in a computer-readable recording medium.

2-2. Driving Environment Information

The control device 100 acquires driving environment information 200 that indicates the driving environment of the vehicle 1. The driving environment information 200 is stored in the storage device 120.

Figure 7:
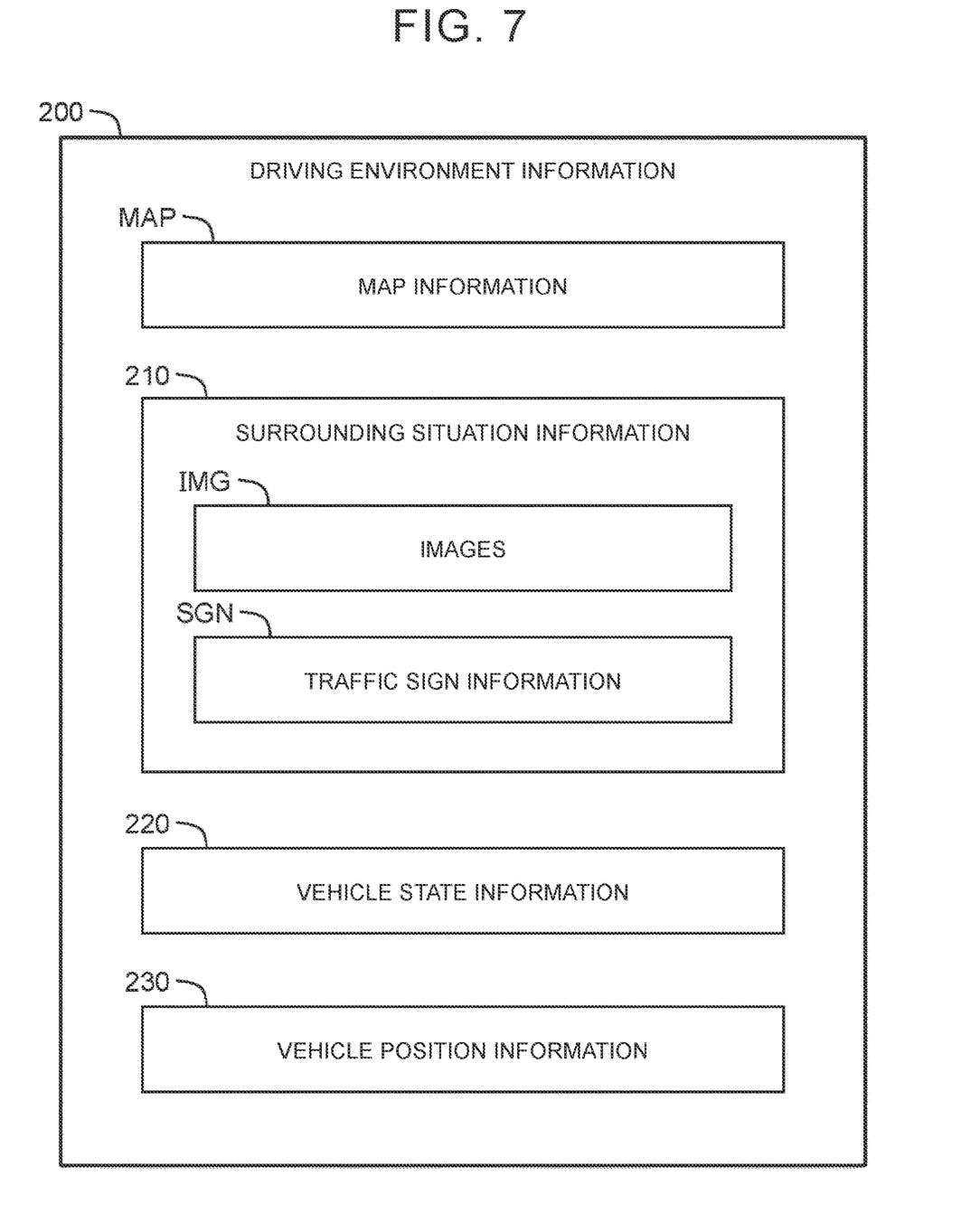
FIG. 7 is a block diagram illustrating an example of driving environment information according to the embodiment of the present disclosure.

FIG. 7 is a block diagram illustrating an example of the driving environment information 200. The driving environment information 200 includes the map information MAP, a surrounding situation information 210, a vehicle state information 220, and a vehicle position information 230.

The map information MAP contains a general navigation map. The map information MAP may show lane layouts and road profiles. The map information MAP may include position information of structures, traffic lights, traffic signs, and so forth. Further, predetermined speed limits LM are registered in the map information MAP. That is to say, the map information MAP indicates the position and the predetermined speed limit LM in correlation. In the map information MAP, the position and the road type may be correlated. The control device 100 acquires map information MAP for a necessary area from a map information base. The map information base may be stored in the storage device 120, or may be stored in a map management system that is external from the vehicle 1. In the case of the latter, the control device 100 communicates with the map management system to acquire the necessary map information MAP.

The surrounding situation information 210 is information that indicates the situation around the vehicle 1. The control device 100 recognizes the situation around the vehicle 1 using the recognition sensor 21, and acquires the surrounding situation information 210. For example, the surrounding situation information 210 includes images IMG taken by the camera C. As another example, the surrounding situation information 210 includes point group information obtained by a LIDAR sensor.

The surrounding situation information 210 further includes object information about objects that are present around the vehicle 1. Examples of objects include pedestrians, bicycles, other vehicles (such as vehicles traveling ahead, parked vehicles, and so forth), traffic demarcation lines, traffic signs, traffic lights, structures, and so forth. The object information indicates the relative position and relative speed of the objects with respect to the vehicle 1. For example, the objects can be identified and the relative positions of the objects can be calculated, by analyzing images IMG obtained by the camera C. Also, the objects can be identified and the relative positions and the relative speeds of the objects can be acquired based on point group information obtained by a LIDAR sensor.

In particular, traffic sign information SGN is object information about traffic signs that are present around the vehicle 1. Traffic signs include a general speed limit traffic sign S0 (see FIG. 1) installed on the wayside of a road. Traffic signs also include a first traffic sign S1 that indicates a start of a temporary speed limit section X1. Examples of the first traffic sign S1 include a road construction sign indicating the start of a road construction section, a variable electronic traffic sign for changeably displaying the speed limit, a speed limit traffic sign to which is attached a supplementary traffic sign indicating the application conditions of the speed limit, and so forth (see FIG. 3). Traffic signs also include a second traffic sign that indicates an end of the temporary speed limit section X1. The traffic sign information SGN indicates the relative position and the type of traffic sign. The traffic sign information SGN may indicate the content of the traffic sign (speed limit or the like). The control device 100 acquires the traffic sign information SGN based on images IMG obtained by the camera C. For example, the control device 100 may use image-recognition artificial intelligence (AI) obtained by machine learning to recognize the traffic signs and the types and contents thereof in the images IMG.

The vehicle state information 220 is information that indicates the state of the vehicle 1. The vehicle state information 220 includes vehicle speed, acceleration, yaw rate, steering angle, and so forth. The control device 100 acquires the vehicle state information 220 from the vehicle state sensor 22.

The vehicle position information 230 is information that indicates the current position of the vehicle 1. The control device 100 acquires the vehicle position information 230 from the results of detection by the position sensor 23. Also, the control device 100 may acquire high-precision vehicle position information 230 through well-known self-position estimation processing (localization), in which the object information and the map information MAP are used.

2-3. Speed Limit Display Processing

The control device 100 performs speed limit display processing for displaying the speed limit on the display device 30. For example, the control device 100 displays the speed limit obtained from the speed limit traffic sign S0 on the display device 30, based on the traffic sign information SGN. As another example, the control device 100 may display a temporary speed limit LMtemp obtained from the first traffic sign S1 on the display device 30, based on the traffic sign information SGN. Further, the control device 100 performs speed limit display processing based on the map information MAP. The speed limit display processing based on the map information MAP will be described again in Section 3 below.

2-4. Warning Processing

The control device 100 may warn the driver by the alarm device 40. For example, the control device 100 compares the current speed of the vehicle 1 with the speed limit at the position at which the vehicle 1 is traveling. The current speed of vehicle 1 is obtained from the vehicle state information 220. The speed limit is the speed limit displayed on the display device 30, and is the predetermined speed limit LM or a temporary speed limit LMtemp. When the current speed of the vehicle 1 exceeds the speed limit, the control device 100 warns the driver by the alarm device 40.

2-5. Vehicle Traveling Control

The control device 100 performs vehicle traveling control for controlling traveling of the vehicle 1. The vehicle traveling control includes steering control, acceleration control, and deceleration control. The control device 100 performs vehicle traveling control by controlling the traveling device 50 (steering device, drive device, and braking device).

The control device 100 may perform adaptive speed control to control the speed of the vehicle 1 based on the speed limit. The speed limit here is the speed limit displayed on the display device 30, and is the predetermined speed limit LM or a temporary speed limit LMtemp. For example, the control device 100 performs adaptive cruise control (ACC) based on the speed limit. As another example, the control device 100 may automatically control the vehicle speed so as to be no faster than the speed limit.

3. Processing Related to Speed Limit Display Processing

Figure 8:
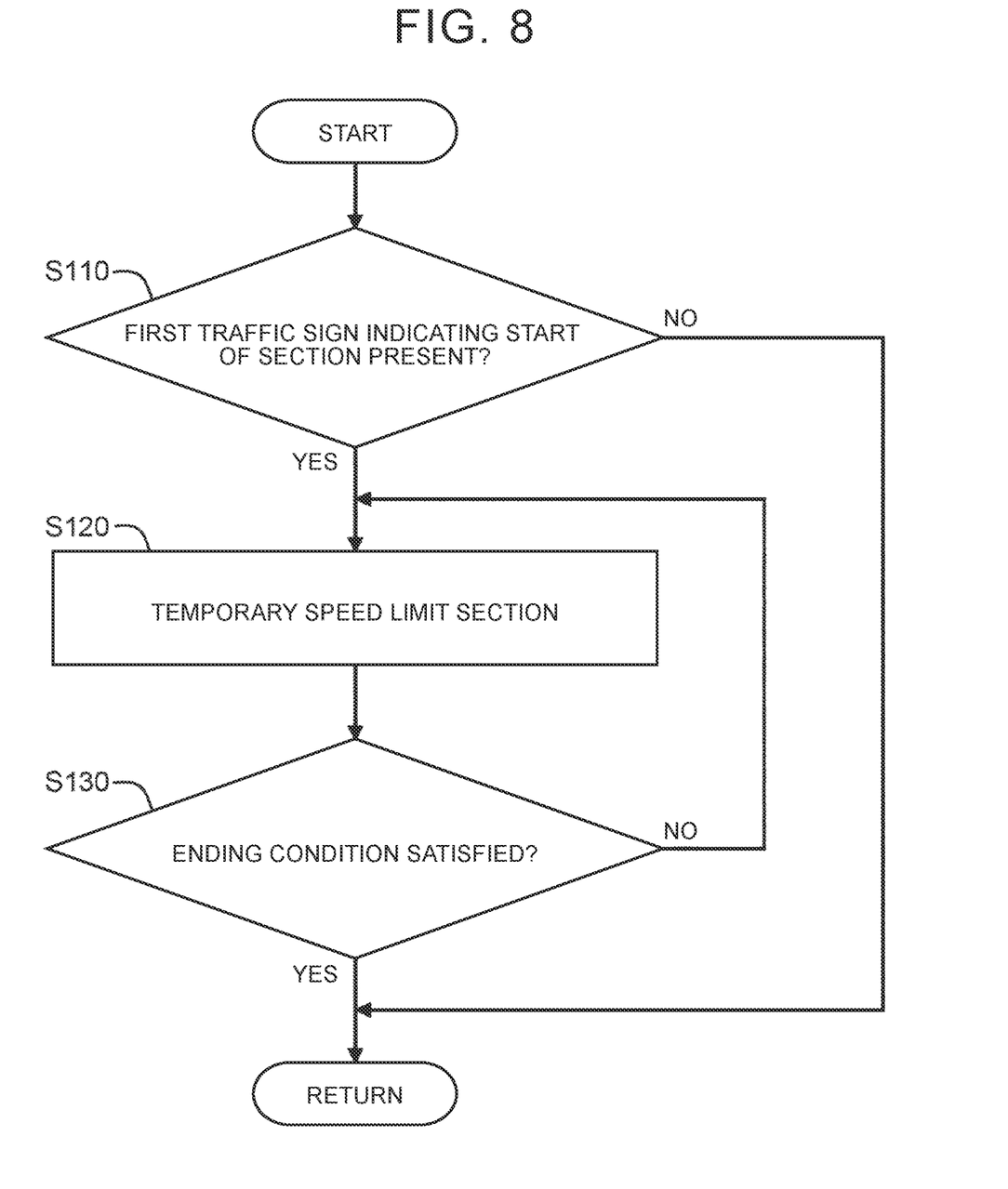
FIG. 8 is a flowchart showing processing related to the speed limit display processing according to the embodiment of the present disclosure.

FIG. 8 is a flowchart showing processing for recognizing the temporary speed limit section X1. The flow of FIG. 8 may be initiated when the vehicle 1 starts traveling.

In step S110, the control device 100 determines whether the first traffic sign S1 is present around the vehicle 1 (typically ahead of the vehicle 1), based on the traffic sign information SGN. The first traffic sign S1 is a traffic sign indicating the start of the temporary speed limit section X1. For example, the first traffic sign S1 is one of a road construction sign indicating the start of a road construction section, a variable electronic traffic sign for changeably displaying the speed limit, and a speed limit traffic sign to which is attached a supplementary traffic sign indicating the application conditions of the speed limit (see FIG. 3). As described above, the first traffic sign S1 may be recognized based on images IMG obtained by the camera C installed in the vehicle 1. When there is presence of the first traffic sign S1 around the vehicle 1 (YES in step S110), the processing advances to step S120. Otherwise (NO in step S110), the processing ends for the current cycle.

In step S120, the control device 100 recognizes the section beyond the first traffic sign S1 as being the temporary speed limit section X1. When the vehicle 1 is positioned in the section beyond the first traffic sign S1, the control device 100 determines that the vehicle 1 is in the temporary speed limit section X1. Thereafter, the processing advances to step S130.

In step S130, the control device 100 determines whether an ending condition is satisfied. The ending condition is a condition for determining the end of the temporary speed limit section X1.

A first example of the ending condition is that "the vehicle 1 has made a right turn or a left turn". A right turn or a left turn of the vehicle 1 can be detected based on the vehicle position information 230 and the map information MAP. Alternatively, a right turn or a left turn of the vehicle 1 may be detected based on the vehicle state information 220 (vehicle speed, steering angle, or the like).

A second example of the ending condition is "recognizing a second traffic sign indicating ending of the temporary speed limit section X1". The second traffic sign explicitly indicates the end (cancellation) of the temporary speed limit section X1. As described above, the second traffic sign may be recognized based on images IMG obtained by the camera C installed in the vehicle 1.

A third example of the ending condition is that "the vehicle 1 has traveled a certain distance from the start of the temporary speed limit section X1". Whether the vehicle 1 has traveled a certain distance can be determined based on the vehicle position information 230 and the map information MAP. Alternatively, whether the vehicle 1 has traveled a certain distance may be determined based on an integral of the vehicle speed.

The ending condition includes any one of the first to third examples described above. When the ending condition is not satisfied (NO in step S130), the processing returns to step S120. On the other hand, when the ending condition is satisfied (YES in step S130), the control device 100 determines that the temporary speed limit section X1 has ended.

Figure 9:
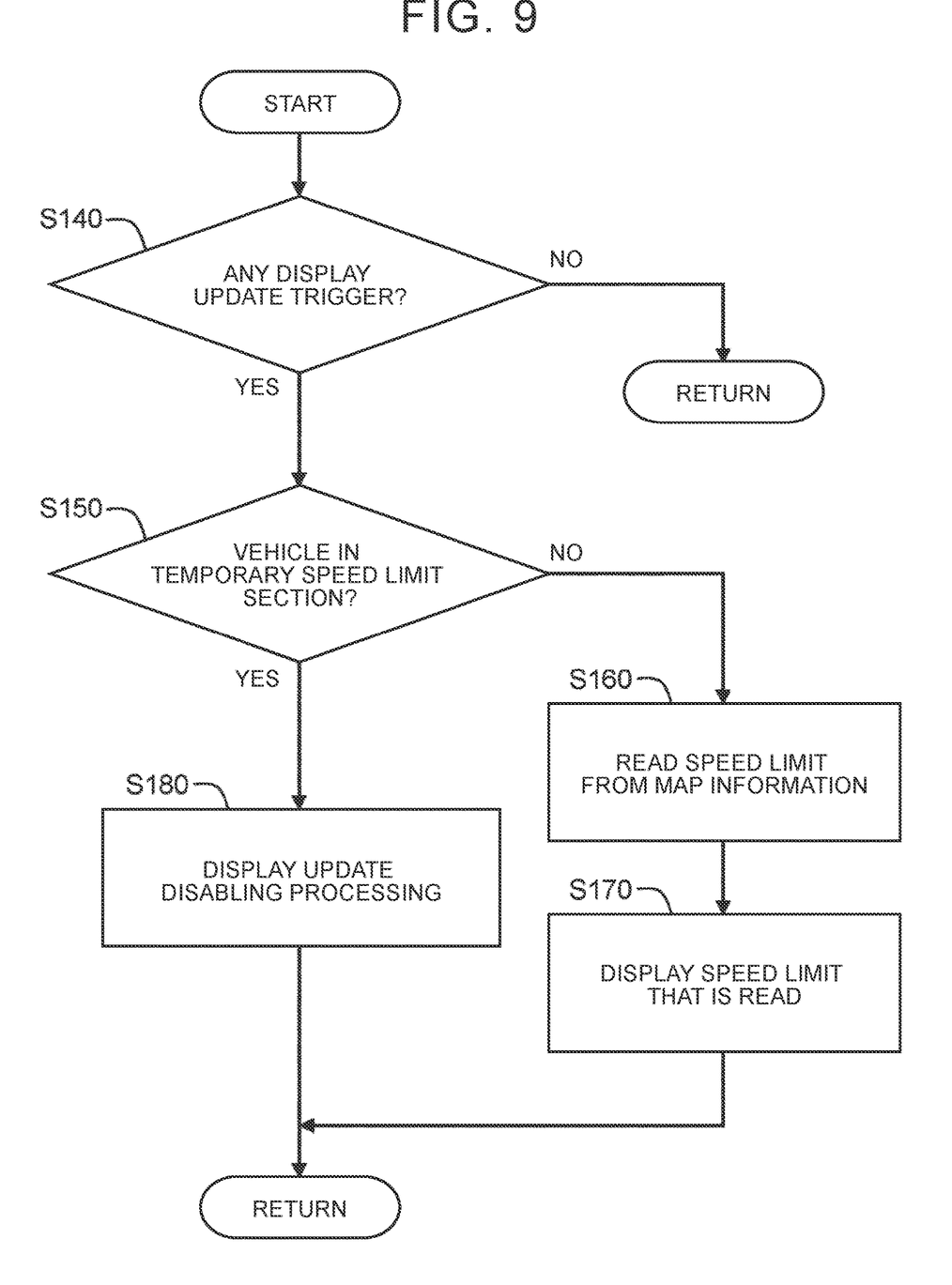
FIG. 9 is a flowchart showing processing related to the speed limit display processing according to the embodiment of the present disclosure.

FIG. 9 is a flowchart showing processing related to speed limit display processing. The flow of FIG. 9 may be initiated when the vehicle 1 starts traveling.

In step S140, the control device 100 determines presence or absence of a display update trigger.

A first example of a display update trigger is "the vehicle 1 passing a speed limit boundary BD". A speed limit boundary BD is a position at which the predetermined speed limit LM changes. The vehicle 1 passing the speed limit boundary BD is detectable based on the vehicle position information 230 and the map information MAP.

A second example of a display update trigger is "recognizing the speed limit traffic sign S0" or "recognizing the first traffic sign S1". As described above, the speed limit traffic sign S0 and the first traffic sign S1 may be recognized based on images IMG obtained by the camera C installed in the vehicle 1.

When there is no display update trigger (NO in step S140), the processing ends for the current cycle. On the other hand, when there is a display update trigger (YES in step S140), the processing advances to step S150.

In step S150, the control device 100 determines whether the vehicle 1 is in the temporary speed limit section X1. Whether the vehicle 1 is in the temporary speed limit section X1 is determined by the processing flow shown in FIG. 8 above.

When the vehicle 1 is not in the temporary speed limit section X1 (NO in step S150), the processing advances to step S160. In step S160, the control device 100 reads the predetermined speed limit LM at the position at which the vehicle 1 is traveling, from the map information MAP. Then, in step S170, the control device 100 displays the predetermined speed limit LM read from the map information MAP on the display device 30. That is to say, the control device 100 updates the speed limit displayed on the display device 30, in response to the display update trigger.

On the other hand, when the vehicle 1 is in the temporary speed limit section X1 (YES in step S150), the processing advances to step S180. In step S180, the control device 100 performs display update disabling processing. That is to say, the control device 100 disables updating of the speed limit to be displayed on the display device 30 (based on the map information MAP), even when there is a display update trigger.

Note that there are cases in which the first traffic sign S1 indicating the start of the temporary speed limit section X1 indicates a temporary speed limit LMtemp applied to that temporary speed limit section X1 (see FIG. 3). In such a case, when the vehicle 1 is in the temporary speed limit section X1 (YES in step S150), the control device 100 may display the temporary speed limit LMtemp acquired from the first traffic sign S1 on the display device 30.

When the first traffic sign S1 does not indicate a temporary speed limit LMtemp, the control device 100 may maintain the speed limit displayed on the display device at the speed limit before reaching the temporary speed limit section X1. Alternatively, the control device 100 may temporarily turn off the speed limit display processing until the temporary speed limit section X1 ends. In this case, an arrangement may be made in which the display device 30 does not display the speed limit, until the temporary speed limit section X1 ends.

4. Effects

As described above, according to the present embodiment, even when the predetermined speed limit LM registered in the map information MAP changes in the temporary speed limit section X1 in which the temporary speed limit LMtemp is set, the speed limit displayed on the display device 30 is not updated. Thus, an incorrect speed limit that is deviated from the actual state is suppressed from being displayed on the display device 30.

Also, situations in which the speed of the vehicle 1 is erroneously determined to be exceeding the speed limit are suppressed. As a result, incorrect warnings are suppressed from being issued to the driver.

Further, in adaptive speed control based on the speed limit, setting of an incorrect vehicle speed is suppressed. As a result, the precision of adaptive speed control is improved.

What is claimed is:

1. A driver assistance method that is applied to a vehicle, the driver assistance method comprising:
    reading a speed limit at a position at which the vehicle is traveling, from map information in which the speed limit is registered;
    displaying the speed limit read from the map information on a display device; disabling updating of the speed limit to be displayed on the display device based on the map information in a first section in which a temporary speed limit is set, even when the speed limit registered in the map information changes;
    detecting, based on the traveling position of the vehicle and the map information, that the vehicle passes through a speed limit boundary that is a position at which the speed limit changes;
    determining, when it is detected that the vehicle passes through the speed limit boundary, whether or not the vehicle is in the first section in which the temporary speed limit is set;
    updating a predetermined speed limit displayed on the display device in conjunction with the vehicle passing through the speed limit boundary in a section other than the first section;
    maintaining the speed limit displayed on the display device when a first traffic sign does not indicate the temporary speed limit; and
    turning off speed display processing on the display device until the temporary speed limit of the first section ends.

2. The driver assistance method according to claim 1, further comprising recognizing the first section, based on an image of around the vehicle, obtained by a camera installed in the vehicle.

3. The driver assistance method according to claim 2, wherein recognizing the first section includes recognizing a start of the first section by recognizing the first traffic sign indicating the start of the first section, based on the image.

4. The driver assistance method according to claim 3, wherein the first traffic sign is any one of a road construction sign indicating the start of a road construction section, a variable electronic traffic sign for changeably displaying the speed limit, and a speed limit traffic sign accompanied by a supplementary traffic sign indicating conditions under which the speed limit is applied.

5. The driver assistance method according to claim 3, further comprising displaying the temporary speed limit on the display device in the first section when the first traffic sign indicates the temporary speed limit.

6. The driver assistance method according to claim 2, wherein recognizing the first section includes recognizing an end of the first section by recognizing a second traffic sign indicating the end of the first section, based on the image.

7. The driver assistance method according to claim 1, further comprising determining that the first section is ended when an ending condition is satisfied, the ending condition including at least one of:
    the vehicle making a right turn or a left turn;
    the vehicle traveling a certain distance from the start of the first section; and
    recognizing a traffic sign that indicates the end of the first section.

8. The driver assistance method according to claim 1, further comprising warning a driver of the vehicle when a speed of the vehicle exceeds the speed limit displayed on the display device.

9. A driver assistance system that is applied to a vehicle, the driver assistance system comprising:
    one or a plurality of storage devices configured to store map information in which a speed limit is registered; and
    one or a plurality of processors configured to:
    read the speed limit at a position at which the vehicle is traveling, from the map information,
    display the speed limit read from the map information on a display device,
    disable updating of the speed limit to be displayed on the display device based on the map information in a first section in which a temporary speed limit is set, even when the speed limit registered in the map information changes,
    detect, based on the traveling position of the vehicle and the map information, that the vehicle passes through a speed limit boundary that is a position at which the speed limit changes,
    determine, when it is detected that the vehicle passes through the speed limit boundary, whether or not the vehicle is in the first section in which the temporary speed limit is set,
    update a predetermined speed limit displayed on the display device in conjunction with the vehicle passing through the speed limit boundary in a section other than the first section,
    maintain the speed limit displayed on the display device when a first traffic sign does not indicate the temporary speed limit, and
    turn off speed display processing on the display device until the temporary speed limit of the first section ends.

\* \* \* \* \*